May 25, 1926.  
A. L. JENNINGS  
1,585,720  
MACHINERY OR APPARATUS FOR WASHING COKE, BREEZE, AND THE LIKE  
Filed August 12, 1924  10 Sheets-Sheet 1

Inventor,  
Arthur Lake Jennings,

May 25, 1926.

A. L. JENNINGS 1,585,720

MACHINERY OR APPARATUS FOR WASHING COKE, BREEZE, AND THE LIKE

Filed August 12, 1924    10 Sheets-Sheet 3

Inventor,

Arthur Lake Jennings,

May 25, 1926.

A. L. JENNINGS 1,585,720

MACHINERY OR APPARATUS FOR WASHING COKE, BREEZE, AND THE LIKE

Filed August 12, 1924 10 Sheets-Sheet 9

Inventor,
Arthur Lake Jennings,

May 25, 1926.

A. L. JENNINGS

1,585,720

MACHINERY OR APPARATUS FOR WASHING COKE, BREEZE, AND THE LIKE

Filed August 12, 1924    10 Sheets-Sheet 10

Inventor,
Arthur Lake Jennings,

Patented May 25, 1926.

1,585,720

UNITED STATES PATENT OFFICE.

ARTHUR LAKE JENNINGS, OF CLECKHEATON, ENGLAND.

MACHINERY OR APPARATUS FOR WASHING COKE, BREEZE, AND THE LIKE.

Application filed August 12, 1924, Serial No. 731,605, and in Great Britain August 13, 1923.

This invention relates to improvements in machinery or apparatus for washing coke, breeze, pan ash, furnace ashes and the like for removing scale, dross, and other impurities therefrom, thereby increasing the commercial value.

In apparatus hitherto employed for the above purpose a difficulty has frequently arisen in that pieces of coke which are heavier in specific gravity than water have fallen to the bottom of the apparatus, and the said heavier pieces have been elevated away with the dross or slag at the bottom of the apparatus.

The object of this invention is to prevent the heavier pieces from falling to the bottom, but should they fall, to cause them to rise and to pass away through the washed coke outlet chute, or discharger, the improved apparatus being constructed as hereinafter described.

According to this invention an outer tank or chamber,—hereinafter termed the "outer tank",—is employed. Within the outer tank is arranged an inner circular chamber or compartment preferably,—though not necessarily so,—out of centre. The wall of the said chamber or compartment,—hereinafter termed and included in the term the "chamber",—is made parallel for a portion of its depth and then is made to taper inwards as it approaches a central restricted opening at the bottom. The said chamber is fixed in position by any suitable means, such as, stays, for securing it to the outer tank which may either be provided with vertical parallel walls for the whole of its depth, or they may be made partly parallel and then arranged to taper inwards. Within the chamber and carried in suitable bearings or footstep is arranged a vertical shaft receiving motion from any suitable source of power. On the shaft is either fixed or adjustably mounted a propeller for causing the water in the chamber to form a vortex therein whereby the heavier particles of fuel are caused to rise and to pass out over a chute after being washed, and the dross to fall through the restricted opening in the bottom of the chamber. The dross is removed from the outer tank by means of the buckets of an elevator working over pulleys which may be fixed to suitable frame work either connected with, or arranged at a distance from, the washing apparatus.

The water is conveyed to the outer tank and chamber from any suitable source of supply.

In some cases the washed material is arranged to pass directly from the chamber into a revolving screen provided with projections or buckets for raising it and delivering it on to a chute. The periphery of the said screen is perforated and it is arranged to partly revolve in the outer tank in the space between the outer perimeter of the chamber and the inner surface of the wall of the outer tank.

In the drawings hereunto annexed are shown two arrangements for carrying the invention into practice, in which—

Like parts in all the views are marked with similar reference numerals.

Figure 5:
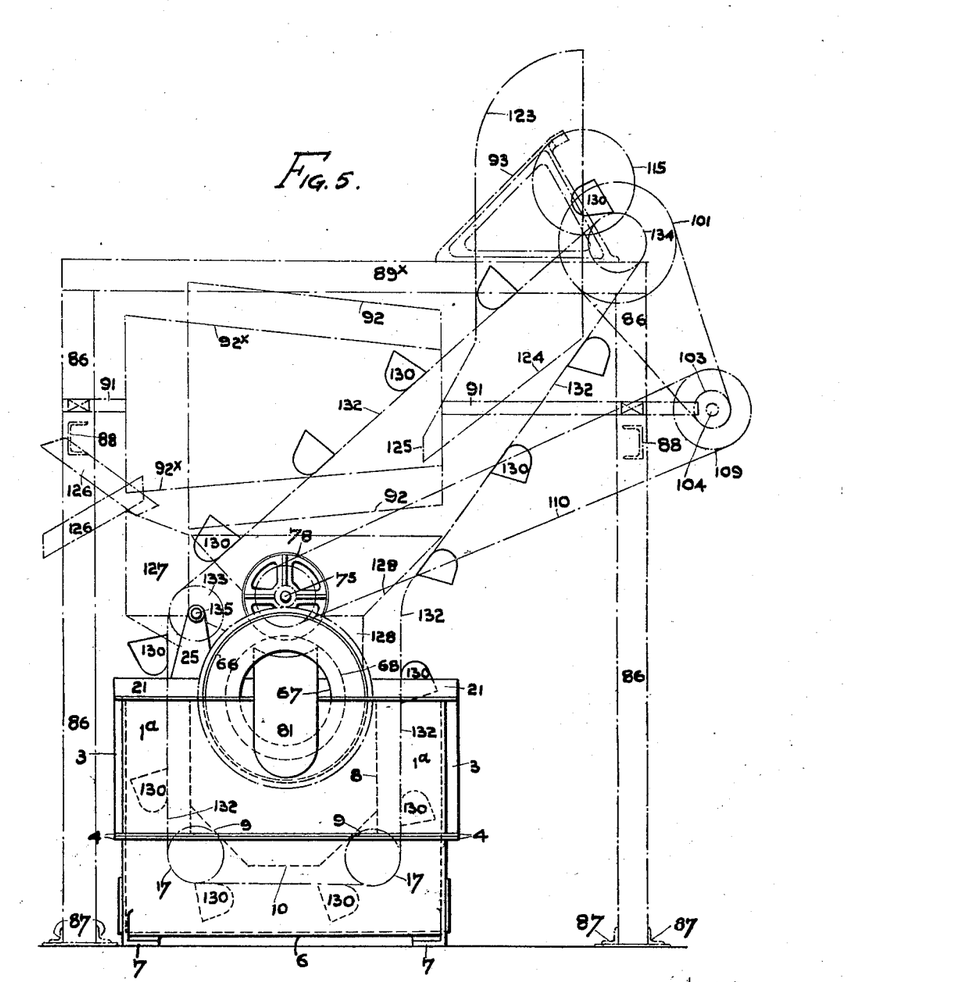
Fig. 5 an elevation of the washing apparatus with the dross elevator, upper screen, framework and driving mechanism shown in dotted lines.
Figure 8:
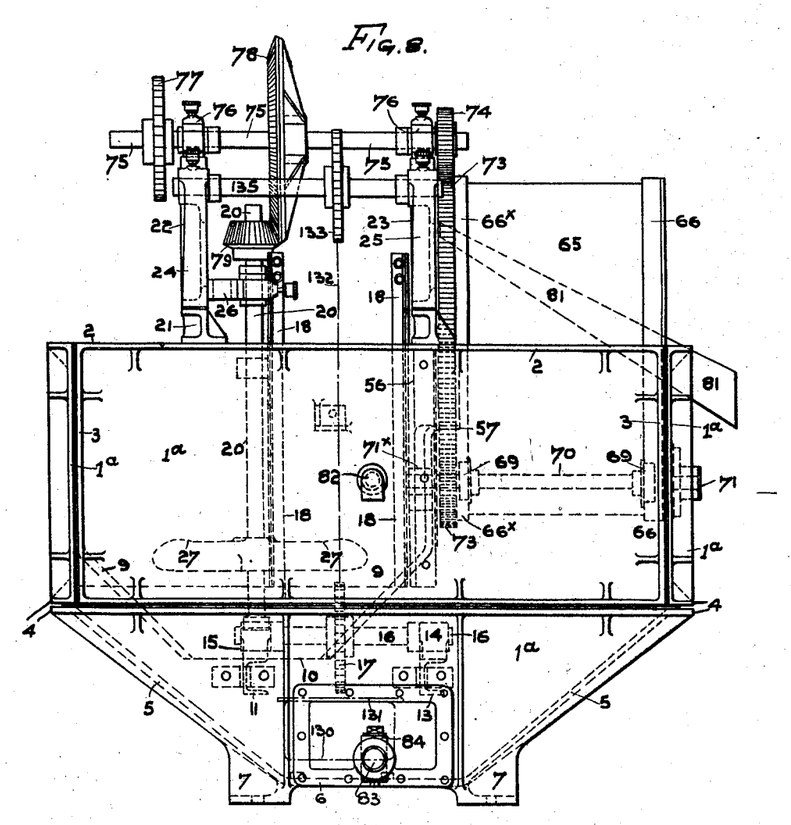
Fig. 8 an elevation of the same machine drawn at a right angle to Fig. 6.

1 is the outer tank which may be made of any suitable and convenient size, and in one or more portions if so desired. It may also be made in depth in one or more parts. At Figs. 1 and 2 the outer tank is formed in one portion and is provided with a flange 2 at its top, but at Figs. 5 and 8 each side is shown made in two parts provided with flanges 3, 3, 4, 4, by which the sides and ends of the trough are bolted together with or without a packing between them. The upper portion 1ª of the tank is made with vertical sides and, as shown at Fig. 8, two of the sides 5, 5, are made to taper inwards towards the centre of the tank. The inclination of the parts is such as to permit of there being a flat surface 6 at the bottom of the tank for purposes to be presently described. The tank is, in some cases, also provided with feet 7, as shown at Fig. 3, or, when such feet are dispensed with, then the tank is mounted upon a suitable stand or other foundation, or upon a baulk or beam of timber.

Figure 7:
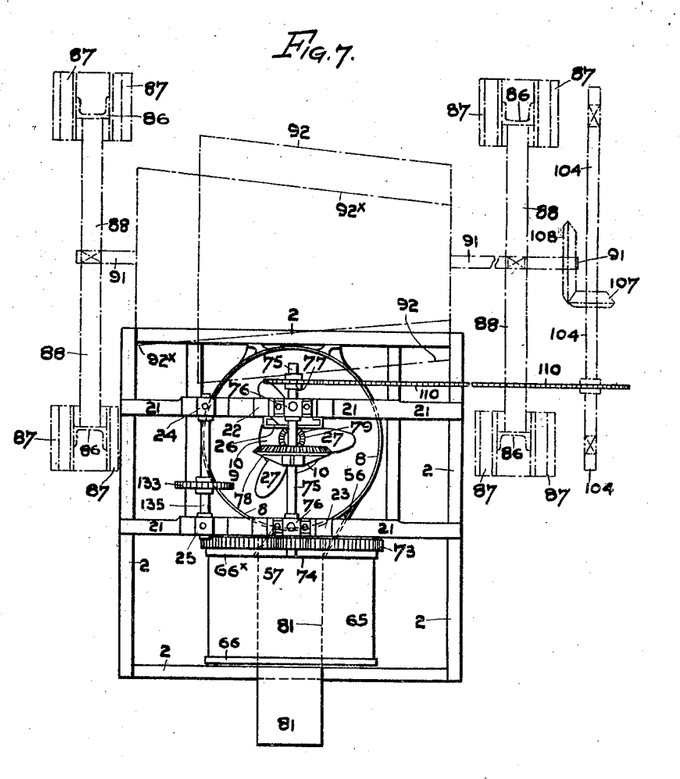
Fig. 7 is a plan of Fig. 5.
Figure 10:
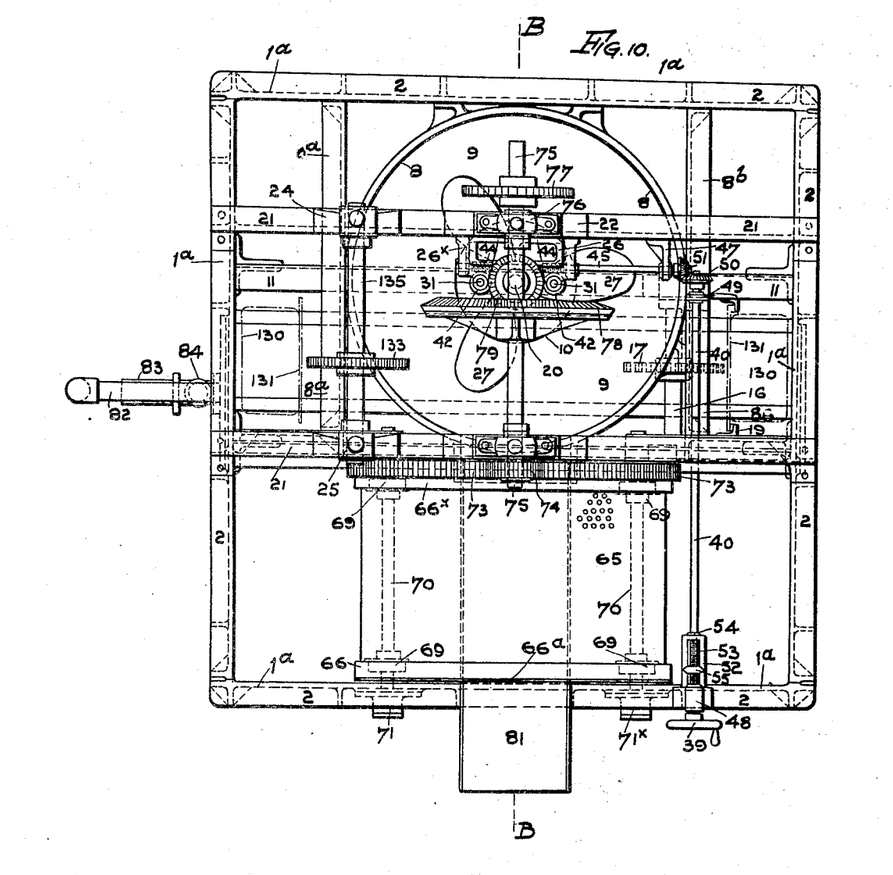
Fig. 10 is a plan of Fig. 8.

The outer tank may be made of metal, or any other suitable material, and of any convenient size and shape, such as rectangular, or square, or circular. Within the outer tank 1 is arranged an inner circular chamber 8 which is preferably,—though not necessarily so,—arranged out of centre, as shown in plan views Figs. 2, 7 and 10. The inner chamber 8 is fixed to vertical division plates 8ª, 8ᵇ, which extend a suitable distance within the tank 1 from its top.

The wall of the chamber 8 is made,—like the outer tank,—vertical and parallel for a portion of its length, and then is made to taper inwards at 9 as the wall approaches a central and restricted opening 10 at the bottom of the chamber. The chamber 8 is retained in position by the division plates 8ª, 8ᵇ or by suitable stays,—not shown in the drawings,—and it is also mounted upon a transverse girder 11 at or about the centre of the tank and its restricted opening. The upper portion of the chamber is either level with, or it may be carried a suitable distance above or below the upper surface of the flange 2 of the outer tank 1.

On the horizontal stay or girder 11 a footstep or other bearing 12 is formed or fixed thereto by any convenient means. A second girder 13 is also arranged at a suitable distance from the girder 11 on which is mounted a pedestal 14 in alignment with a second pedestal 15 which is mounted upon the girder 11. The pedestals 14 and 15 are employed for supporting the horizontal shaft 16 upon which is fixed a sprocket wheel 17.

Figure 6:
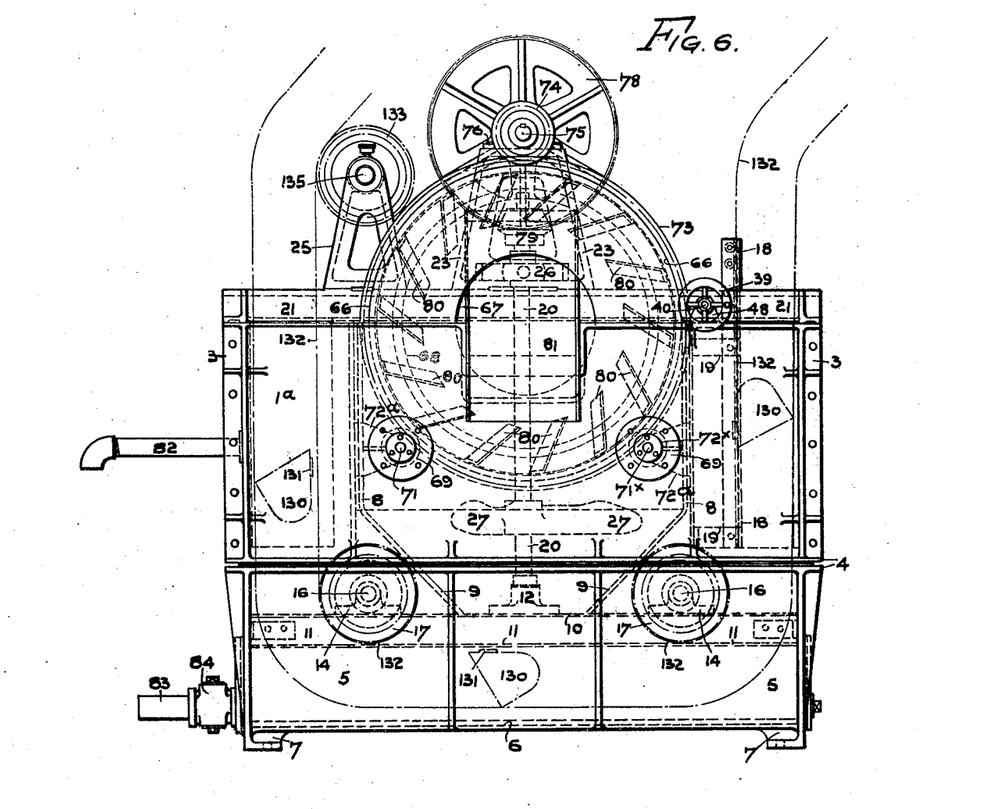
Fig. 6 an enlarged elevation of the lower portion of Fig. 5.

At or near the top of the outer tank 1 are fixed two vertical bars 18, 18 (Fig. 8) which act as guides for the dredger to be hereinafter described. The said vertical bars are retained in position by brackets 19, 19 (Fig. 6). A vertical shaft 20,—one end of which is carried in the footstep or other bearing 12,—is arranged to project a suitable distance above the flange 2. On the top of the flange 2 are mounted two transverse girders 21, 21, and on these girders are fixed the vertical brackets 22, 23, 24 and 25. To the bracket 22 is fixed a horizontal bracket 26 in which is formed a bearing for the upper portion of the shaft 20. At a suitable distance from the footstep 12 may be fixed or mounted a propeller 27 of any ordinary and suitable construction. At Figs. 1 and 8 the propeller 27 is shown fixed upon the shaft about level with the lower part of the parallel portion of the chamber 8, but at Fig. 9 the propeller 27 is shown fixed to a sliding sleeve 28 for purposes to be presently described.

Instead of the propeller 27 a worm, or an Archimedean screw, or a number of blades, which may or may not be attached to the said shaft or sliding sleeve, may be employed, but it is preferred to use a propeller with curved and inclined blades.

Figure 11:
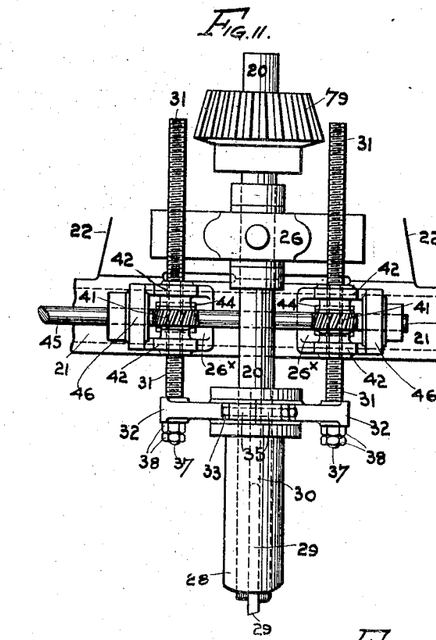
Fig. 11 an enlarged front elevation of the mechanism for adjusting the propeller.
Figure 12:
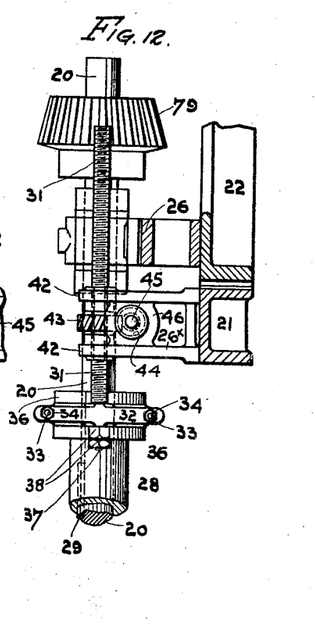
Fig. 12 a part sectional elevation drawn at a right angle to Fig. 11.
Figure 13:
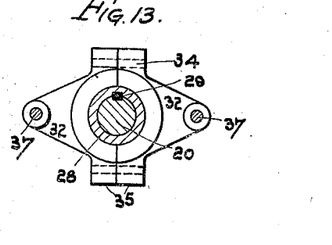
Fig. 13 is a plan of a detail of the means for connecting the adjusting mechanism to the propeller.

When a sliding sleeve 28 is employed, as at Figs. 11 and 13 then a key or spline 29 is fixed to the shaft 20, and a keyway 30 is formed in the central hole of the sliding sleeve 28. The position of the propeller 27 in the chamber 8 is adjusted by any convenient means, such as, for example, say, by a pair of vertical screw shafts 31, 31 which pass through plain vertical holes formed for their reception in the bracket 26ˣ, fixed to the transverse girder 21. The lower ends of the screw shafts 31 are fixed to a horizontal plate 32 made in two parts secured together by bolts 33 passing through the holes 34 in the lugs or projections 35. The plate 32 is arranged to be placed upon the periphery of a circumferential groove formed in the enlarged upper portion 36 of the sliding sleeve 28. The portions of the plate 32,—to which the two vertical screw shafts 31 are secured,—are retained in position thereon by reducing the diameter of the lower ends 37 of the screw shafts and mounting lock nuts 38 thereon. In the periphery of each screw shaft is cut or formed a square screw thread of any suitable pitch and number of leads capable of causing the propeller 27,—secured to the sliding sleeve,—to be raised or lowered, say, one inch for every ten,—more or less,—revolutions of the hereinafter described hand wheel 39 and screw shaft 40. The upper end of each screw shaft is arranged to work through a nut 41 placed between the arms 42, 42 of the bifurcated portion of the bracket 26ˣ. On the periphery of each nut are formed or cut the teeth 43 of a worm wheel with which a worm 44 meshes. The worms are either formed on, or fixed to, a shaft 45 carried in bearings 46 (Fig. 11) of bracket 26ˣ and of a bracket 47 (Fig. 10) fixed to one of the girders 21.

A suitable intermittent rotary motion is imparted from the hand wheel 39 on shaft 40,—the latter being carried in bearings 48 and 49 (Fig. 10),—by means of a bevel wheel 50 fixed upon the said shaft and a bevel pinion 51 fixed upon a shaft 45.

A projection 52 (Fig. 10) is formed on, or attached to, the bearing 48, and in the said projection is an opening 53 and at its end is a bearing 54 for the shaft 40. On each of the portions of the projection 52 which run parallel with the opening 53 is formed a scale with which a pointed indicator 55 mounted on a screw threaded portion is arranged to work in order that the attendant may be able to regulate the position of the propeller within the chamber 8.

It will readily be understood that the hand wheel is on the outside of the outer tank 1 and at a right angle to the shaft 40. By this means the position of the propeller in the tank can be readily adjusted and its position indicated. If desired the scale or index on the projection 52 may be graduated in tens so that the attendant will know when he has made the ten revolutions of the hand wheel for raising or lowering the propeller one inch.

In the parallel portion of the wall of the chamber 8 is formed an opening 56 which is arranged to communicate with a chute or trough 57. At Figs. 1 and 2 the chute is shown to extend beyond the outer tank 1 for delivering the washed material on to any suitable means for conveying it away, such as, an endless conveyor belt 58 which works over a flange or other pulley 59 mounted upon a spindle 60 carried in suitable brackets 61, 61, and to which motion is imparted by means to be presently described. In this case the chute 57 is perforated to allow the water to return to the outer tank 1, but when a short chute 57 is employed, as at Fig. 9, then it is not required to be perforated. The sides of the chute 57 are of such a height that when the water is raised by the revolution of the propeller 27, the water in the chamber 8 will not pass over its upper edge. If desired the sides of the chute 57 may be perforated to within a suitable distance of the vertical walls of the chamber 8, to permit of the water passing from the upper portion of the chamber 8 into the chute 57 to drain back into the outer tank 1. In the space 62 between the inner surface 63 of the outer tank 1 and the outer surface 64 of the chamber 8 is arranged to work a screen 65. The screen 65 is composed of two end rings 66, 66$^x$, to which are fixed the end discs,—perforated or otherwise,—66$^a$, 66$^b$. The ends of the screen are connected together by a perforated or reticulated ring or portion 65 which forms the screen proper. The end pieces are provided with openings 67, 68 which vary in size in each of the end discs, and each end ring is arranged to run upon rollers or wheels 69 mounted upon the shafts 70, 70 carried in bearings 71, 71$^x$, 72, 72$^x$. The bearings 71, 17$^x$ are fixed by any convenient means to the outer surface of the tank 1, and the bearings 72, 72$^x$ are formed in a bracket 72$^a$ fixed to the division plates 8$^a$, 8$^b$. The perforated or reticulated surface of the screen 65 may be made of any suitable shape, mesh or pitch.

The end pieces 66, 66$^x$ may be formed of either angle iron or cast metal, and on the outer surface of the end piece 66$^x$ is also provided a circular rack of spur teeth 73. The circular rack is adapted to engage with a spur wheel 74 mounted upon a shaft 75 which is carried in pedestals 76, 76 fixed respectively to the brackets 22, 23. On the opposite end of shaft 75 is mounted and fixed a sprocket wheel 77 and at or about the centre of the said shaft a bevel wheel 78 which gears with the bevel pinion 79 fixed at a suitable distance from the upper end of shaft 20.

Figure 9:
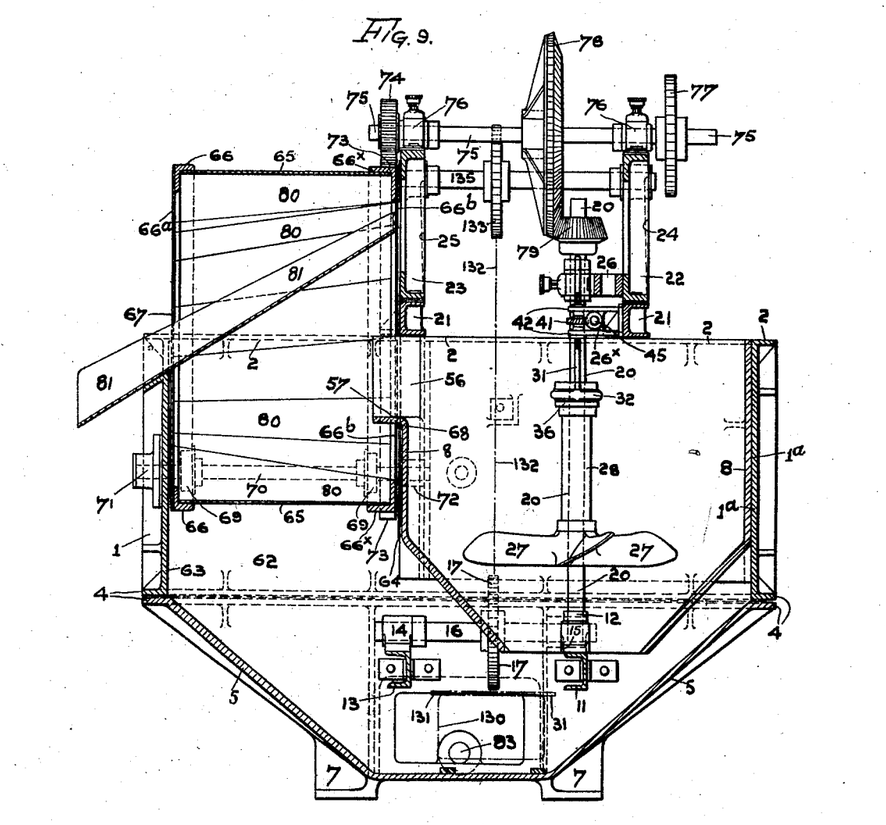
Fig. 9 a sectional elevation on line B, B, Fig. 10 showing the means for adjusting the position of the propeller in the chamber.

On the inner periphery of screen 65 are a number of inclined blades or troughs 80 which are arranged at an incline with the periphery of the screen,—as shown at Fig. 9, —and they also taper in their length from the inner to the outer ends of the screen. The inclined blades or troughs 80 are for elevating the washed coke which is delivered from the chamber 8 through the chute 57 into the screen. The blades or troughs 80 act in a similar manner to the buckets of a "Raff wheel elevator screen", and the material when thus raised is delivered from the buckets into the chute 81 which projects from the inner end of the screen to and beyond the outer end thereof. This chute is employed for delivering the washed material into a wagon, or travelling band, or conveyor, or on to the floor, as may be desired. The arrangement of the revolving elevator screen permits of the water in the outer tank 1 cleaning the screen, and also allows the water from the inner chamber passing out through chute 57, to return to the outer tank 1.

Figure 2:
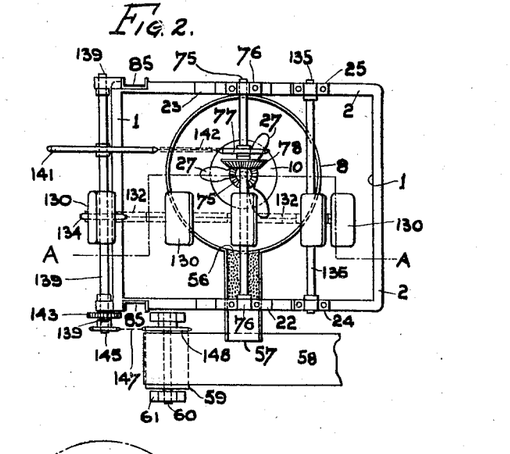
Fig. 2 a plan of Fig. 1 showing the chamber out of centre.
Figure 3:
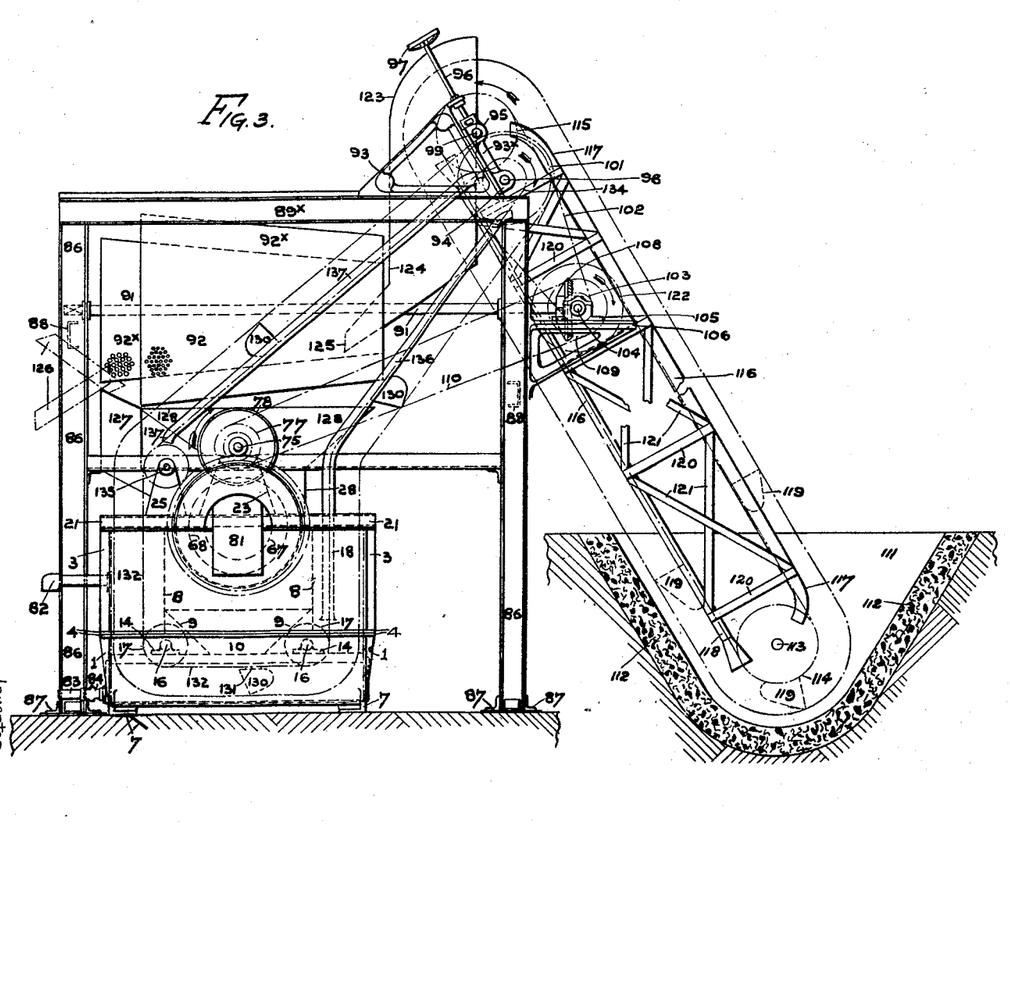
Fig. 3 is a part side elevation and part section showing the washing apparatus partly enclosed within framework and with the screen arranged above the apparatus for delivering the material to be washed to a hopper, and with a discharging screen partly revolving in the washing apparatus.
Figure 4:
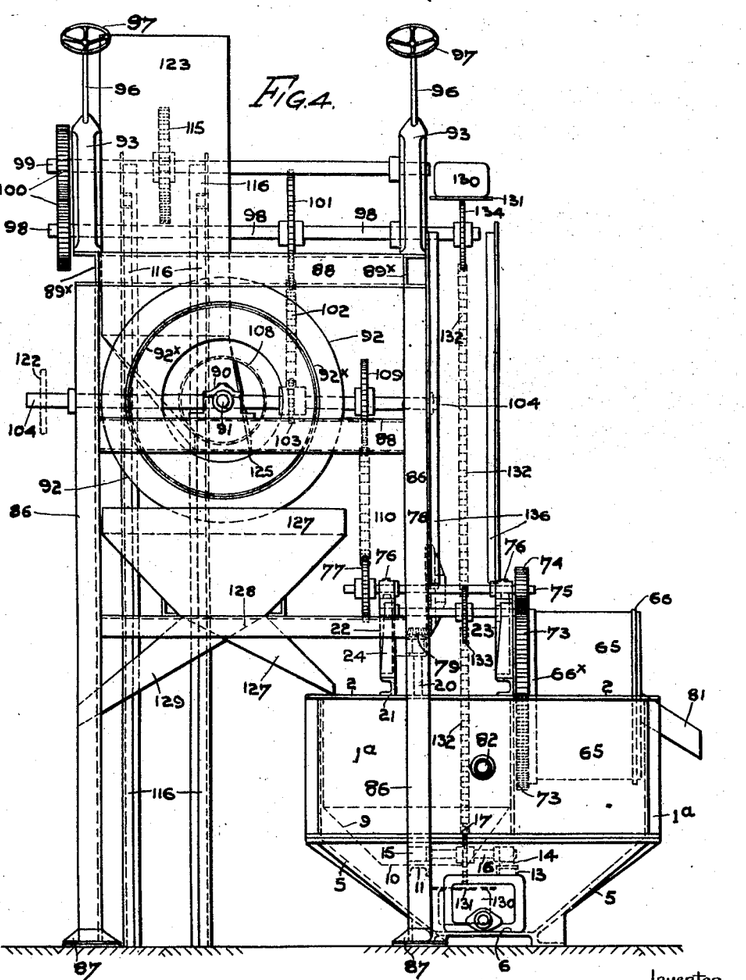
Fig. 4 an end elevation of Fig. 3.

In some cases the chute or trough 57 may deliver the water and washed fuel upon a grate or grid,—not shown in the drawings,— and the fuel may be removed from the grate by buckets secured to an endless chain passing over and driven by a sprocket wheel secured to the shaft 139 in Fig. 2 or shaft 98 in Fig. 4, which shaft would in the latter case be suitably extended, and an idle sprocket or roller secured to a shaft fixed at a suitable distance above the grid or grate in the washer.

The outer tank 1 may be provided with suitable pipes for filling it to the required level with water or other washing liquid, and the outer tank 1 is also provided with an over-flow pipe 82 and with the drain pipe 83 provided with a valve 84 for the removal of any water from the bottom of the tank.

The herein described apparatus is arranged within suitable framework, as shown at Figs. 1, 3, 4, 5 and 7. At Fig. 1 the framework consists of two upright portions 85 fixed at their lower ends to the sides of the outer tank 1, but at Figs. 3 to 5 and 7 it consists of four vertical stanchions 86, 86 fixed at their lower ends to suitable foot pieces 87 and braced together by a number of cross stays 88 and longitudinal stays 89×, 89×.

The framework may be made of angle or channel or other shaped,—in cross section,—iron and it varies in size according to the size of the washing portion of the machine. The said framework is made of girders in skeleton form.

On one of the transverse cross stays 88 are mounted a pair of pedestals 90 (Fig. 4) for carrying a horizontal shaft 91 upon which a single or double tapering or other screen or screens 92, 92× is or are fixed.

On the top of the longitudinal stays 89× are mounted a pair of triangular shaped brackets 93, 93 on which is made to slide a casting 93× having a pair of bearings 94, 95. The position of the casting 93× is adjusted by means of the screw shaft 96 and hand wheel 97.

In the bearings 94 is mounted a horizontal shaft 98, and in the adjustable bearings 95 is also mounted a second horizontal shaft 99, the two said shafts being geared together by the spur wheels 100.

On shaft 98 is fixed a sprocket wheel 101 over which passes an endless chain 102 to a second sprocket wheel 103 fixed upon the transverse shaft 104, which is carried in pedestals 105 (Fig. 3) fixed to the brackets 106 which in turn are secured to the stanchions 86.

On the shaft 104 is mounted a bevel pinion 107 (Fig. 7) which gears with a bevel wheel 108 fixed upon the shaft 91. On the shaft 104 is also mounted a second sprocket wheel 109 over which passes the endless chain 110 for imparting motion to the sprocket wheel 77 mounted upon the shaft 75 whereby motion is imparted to the vertical shaft 20 by means of bevel gearing 78, 79, and also to the spur wheel 74 and circular rack 73 and screen 65 which works partly in the outer tank 1.

The material to be operated upon may be delivered to the chamber 8 by any convenient means, such as, by hand, or by any suitable elevator arrangement. At Fig. 3 of the drawings is shown an elevator arranged on the outside of the framework of the apparatus, and the material in this arrangement is delivered either from barrows or trucks, or a conveyor belt, or other convenient means,—not shown in the drawings,—into a pit 111 which may or may not be lined with concrete 112. In the pit 111 is mounted in suitable bearings,—not shown in the drawings,—a shaft 113 upon which is fixed a sprocket wheel 114. On the shaft 99 is fixed a sprocket wheel 115 which is arranged to be placed centrally between the inclined guides 116 provided with the curved ends 117. Over the sprocket wheels 114, 115 is passed an endless chain 118 to which are fixed a number of elevator buckets 119 at suitable distances apart. The elevator buckets are arranged to be fixed upon crossbars,—not shown in the drawings,—arranged to work on guides 116. The guides 116 are made in skeleton form suitably braced together by the cross pieces 120, 121, and are arranged as shown at Fig. 3.

This form of elevator is of the usual and general construction and will be readily understood without further explanation.

The requisite motion is imparted to a sprocket wheel or pulley 122 fixed upon shaft 104 from any suitable source of power, and from thence transmitted to shafts 98 and 99 as previously described.

The material is elevated from the pit 111 and carried up by the buckets which deliver it into the hood 123 of hopper 124 from which it passes through the chute 125 to the inner screen 92×, when a double screen as shown in the drawings is used, or into the screen 92 when a single screen only is employed. Any material that is too large to pass through the perforated or reticulated surface of the said screen is discharged into an inclined chute 126 which is pivoted in any convenient manner to brackets fixed to the stanchions 86,—not shown in the drawings,—or to one of the cross stays 88, and when pan ash is to be washed, then the inclined chute is arranged in the upper inclined position shown at Fig. 3, but when coke is to be washed, then the chute 126 is in the downward position shown at the same figure.

In the first instance when the inclined chute is in the upper position shown, then any clinkers or other larger material pass or passes from the inner screen 92× directly into the chute 127 for conveyance into the inner chamber 8. The smaller material that has passed through the meshes of the inner screen 92× into the outer screen 92 will be conveyed as tailings and enter the chute 127 for conveyance to chamber 8 for washing purposes. As the last named material travels along the outer screen 92 any dust is removed therefrom and passes into the hopper 128 and is delivered through the chute 129 to the outside of the framework, or into any suitable receptacle provided for the purpose.

Water having been filled into the tank 1 to the requisite level, on rotation of the propeller 27 the water lifted in the inner chamber 8 flows over the weir or opening 56 therein and returns downward through the screen 65 into the outer tank and cascades upwards through the restricted opening 10 in the bottom of the inner chamber 8. The same water is thus continuously circulated without any appreciable loss up through the inner chamber and down through the outer tank.

By arranging one tank within the other, and by the action of the propeller the water in the tanks is kept at different levels so as to circulate upwards in one tank and downwards in the other, thereby enabling the water to be continuously circulated and reused.

The propeller is set at the requisite speed to create a lift on the water such that the coke in the pan ash is kept floating and is ejected therefrom with the water passing over the weir or opening 56 and chute 57. Should any coke fall into the bottom of the chamber 8 it is at once caught by the upward cascade of the water and delivered through the opening 56 to the screen 65, the washed coke being delivered from the said screen through an opening in the outer tank 1 and chute 81.

The separated dross which passes through the orifice 10 in the bottom of the inner chamber 8 falls to the bottom of the outer tank 1 and is removed by the dredger buckets 130 fixed to cross bars 131 secured to an endless chain 132 which passes over the guide pulleys 17, 133 and 134, the latter being mounted upon shaft 98. The sprocket wheel 133 is mounted upon shaft 135 carried by brackets 24 and 25. The bars 131 upon which the buckets 130 are mounted are arranged to work upon the guides 18 and their extended ends 136 and the separate inclined guide 137. The extended end of the guide 136 and also of the separate guide 137 are curved at their ends. Any dross passing through the opening 10 in the inner chamber falls on to the closed end and bottom of the outer tank 1, and is conveyed therefrom by the dredger buckets 130.

By arranging the propeller to be adjustable in the inner chamber 8 the velocity of the discharge of water may be increased or diminished to suit the varying densities of material operated upon.

Figure 1:
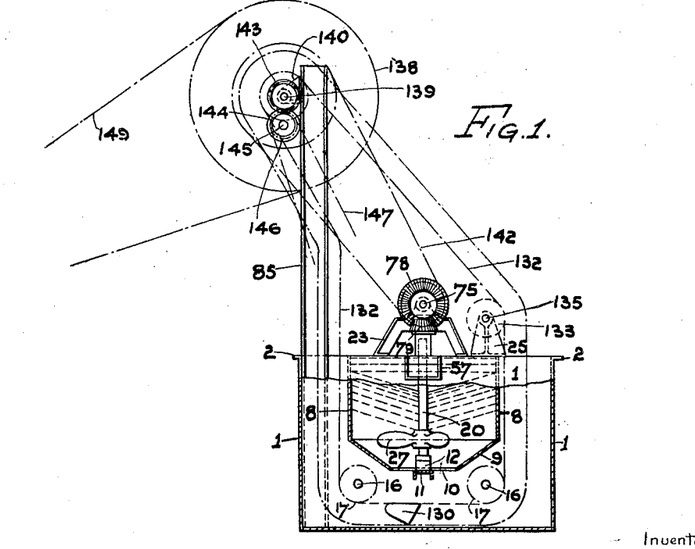
Fig. 1 is a sectional elevation on the irregular line A, A, Fig. 2.

The hereinbefore mentioned framework and driving apparatus may, when required, be modified to that shown at Figs. 1 and 2 of the drawings, whereby the driving pulley 138 is mounted upon a driving shaft 139 carried in suitable bearings formed for their reception in brackets 140 attached to the vertical uprights 85. In this case on the driving shaft 139 is mounted a large sprocket wheel 141 which takes the place of the sprocket wheel 109, and it drives direct by means of an endless chain 142 to the sprocket wheel 77 on shaft 75.

On shaft 139 is mounted a spur pinion 143 arranged to gear with a pinion 144 mounted upon a shaft 145 carried in bearings formed in brackets,—not shown in the drawings,—fixed to the uprights 85. On the shaft 145 is mounted a sprocket wheel 146 which imparts a rotary motion by means of an endless chain or belt 147 to a sprocket wheel or pulley 148 mounted upon shaft 60. By this means motion is imparted to the conveyor belt 58.

The requisite motion to the driving shaft 139 and pulley 138 may be transmitted by a belt or chain 149 from any suitable source of power.

The means for operating the dredger is of a similar nature to that described for the other figures of the drawings, and the required sprocket wheels are the same, but mounted upon the shaft 139.

It will readily be understood that a number of inner chambers 8 and parts connected therewith may be arranged within a single outer tank for washing and separating or grading purposes. In such cases the screen 92 would be increased in length as with various sizes of holes therein as necessary. Also that when required two or more endless chains may be used with the hereinbefore mentioned elevators instead of the one shown, and that the number of elevators may be varied to correspond, if so desired, with the number of inner chambers employed in a single outer tank.

What I claim is:—

1. In washing and separating apparatus of the class described having in combination an outer tank made in sections, an inner chamber fixed therein adjacent one wall of said tank for receiving the material to be washed and separated, said outer tank and inner chamber being made partly vertical and partly tapered, the outer tank being closed at the bottom and having an open top, and the inner chamber having a weir at the top, and a restricted opening in its bottom, both the outer tank and the inner chamber being filled with water to a desired level, a propeller mounted upon a vertical shaft arranged in the inner compartment for raising the lighter material within the chamber onto the weir, and means for discharging the washed material and dross away from said tank and chamber.

2. In washing and separating apparatus of the class described having in combination an outer compartment closed at its bottom and open at the top, an inner chamber open at its top and having a restricted opening at its bottom, a portion of the periphery of the inner chamber being parallel and then made to taper towards the restricted opening at its bottom, a propeller mounted adjustably upon a vertical shaft formed centrally in the inner chamber for causing the washing water to be lifted therein for conveying the washed material to an orifice formed therein, a weir formed in the upper portion of the inner chamber over which the washed material passes, a chute having a partly plain and perforated bottom for conveying the washed material to the outside of the chamber and for returning the water to the said chamber, a screen and an elevator for discharging purposes, as and for the purposes set forth.

3. In washing and separating apparatus of the class as claimed having in combination an outer compartment and an inner chamber, both of which are open at the top, a vertical shaft carried in suitable bearings and having an adjustable propeller mounted thereon, means for adjusting the propeller, a screen arranged partly to revolve within the space between the outer surface of the inner chamber and the inner surface of the outer compartment, means for imparting the requisite motion to the propeller and to the said screen, an elevator for removing the dross from the bottom of the outer compartment, a chute with a partly plain and perforated bottom for conveying the washed material away from the inner chamber and returning the water from the washed material back into the outer compartment, as set forth.

4. In washing and separating apparatus of the class described having in combination an outer compartment, formed in a number of portions and closed at its bottom and provided with an inlet water pipe and a discharge valve and pipe, an inner chamber fixed therein having a portion of its periphery parallel and then arranged to taper towards the restricted opening, a vertical shaft carried in bearings fixed to bearers attached to the outer compartment, an adjustable propeller mounted upon the said vertical shaft, means described for adjusting the position of the propeller on the said shaft, a weir formed in the upper portion of the inner chamber, a short chute attached thereto, a screen arranged above the outer chamber and compartment, a hopper interposed between the said inner chamber and the screen for conveying the material to be washed into the inner chamber, an elevator arranged on the outside of the apparatus for raising and conveying the material to be washed and separated to the said screen, a second screen arranged to work within the space between the outer surface of the inner chamber and the inner surface of the outer compartment for receiving the washed material as it passes through the said short chute, a chute for receiving the elevated washed material as it leaves the outer compartment, an endless elevator provided with buckets and arranged to work over guide pulleys for removing the dross from the bottom of the outer compartment and conveying it away, means for adjusting the said pulley and means described for imparting the requisite motion to the elevators and screens, substantially as described.

ARTHUR LAKE JENNINGS.